US008880491B2

(12) United States Patent
Morris

(10) Patent No.: US 8,880,491 B2
(45) Date of Patent: Nov. 4, 2014

(54) SYSTEMS AND METHODS TO PLAY MEDIA CONTENT SELECTED USING A PORTABLE COMPUTING DEVICE ON A DISPLAY DEVICE EXTERNAL TO THE PORTABLE COMPUTING DEVICE

(75) Inventor: Nadia Morris, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 216 days.

(21) Appl. No.: 12/950,302

(22) Filed: Nov. 19, 2010

(65) Prior Publication Data
US 2012/0130971 A1 May 24, 2012

(51) Int. Cl.
G06F 17/30 (2006.01)
G06F 7/00 (2006.01)
H04N 21/2343 (2011.01)
H04N 21/858 (2011.01)
H04N 21/6543 (2011.01)
H04N 21/41 (2011.01)
H04N 21/436 (2011.01)

(52) U.S. Cl.
CPC .......... *H04N 21/43615* (2013.01); *G06F 17/30* (2013.01); *G06F 17/30522* (2013.01); *H04N 21/234309* (2013.01); *H04N 21/8586* (2013.01); *G06F 17/30699* (2013.01); *G06F 17/30867* (2013.01); *H04N 21/6543* (2013.01); *G06F 17/30029* (2013.01); *H04N 21/4126* (2013.01); *G06F 17/30516* (2013.01); *G06F 17/30017* (2013.01); *Y10S 707/913* (2013.01)
USPC .......... 707/706; 707/913; 709/203; 709/219; 725/109; 725/25

(58) Field of Classification Search
None
See application file for complete search history.

(56) References Cited

U.S. PATENT DOCUMENTS

| 2005/0251566 | A1* | 11/2005 | Weel | 709/219 |
| 2010/0281108 | A1* | 11/2010 | Cohen | 709/203 |
| 2010/0281508 | A1* | 11/2010 | Poder et al. | 725/93 |
| 2010/0293598 | A1* | 11/2010 | Collart et al. | 726/3 |
| 2011/0064377 | A1* | 3/2011 | Gharaat et al. | 386/238 |
| 2011/0119721 | A1* | 5/2011 | Piepenbrink et al. | 725/109 |
| 2011/0131332 | A1* | 6/2011 | Bouazizi | 709/227 |
| 2011/0135283 | A1* | 6/2011 | Poniatowki et al. | 386/297 |
| 2011/0138429 | A1* | 6/2011 | Schade et al. | 725/98 |
| 2011/0158610 | A1* | 6/2011 | Paul et al. | 386/297 |
| 2012/0060100 | A1* | 3/2012 | Sherwood et al. | 715/748 |
| 2012/0072944 | A1* | 3/2012 | Felt et al. | 725/25 |

OTHER PUBLICATIONS

Google TV "There's More on TV Than Television" —http://www.google.com/tv/features.html, printed Oct. 18, 2010, 5 pp.

* cited by examiner

*Primary Examiner* — Dung K Chau
(74) *Attorney, Agent, or Firm* — Toler Law Group, PC

(57) ABSTRACT

A particular method includes identifying, at a portable computing device, media content that is accessible from a remote computing device via a network. The method includes receiving user input associated with a particular media content item of the identified media content. The user input indicates selection of a send media to a second device option associated with the particular media content item. The method includes generating a message in response to the user input, wherein the message includes information identifying the particular media content item. The method also includes sending the message from the portable computing device to an application server that provides media content to a set top box device. In response to the message, the application server sends information to the second device that causes the set top box device to automatically play the particular media content item.

20 Claims, 6 Drawing Sheets

SYSTEMS AND METHODS TO PLAY MEDIA CONTENT SELECTED USING A PORTABLE COMPUTING DEVICE ON A DISPLAY DEVICE EXTERNAL TO THE PORTABLE COMPUTING DEVICE

FIELD OF THE DISCLOSURE

The present disclosure is generally related to playing media content selected using a portable computing device on a display device external to the portable computing device.

BACKGROUND

A portable computing device (e.g., a mobile communication device, a tablet computer, or a laptop computer) may run applications to perform tasks. One application may allow the portable computing device to function as a remote control for an electronic device, such as a set top box device. The portable computing device running the remote control application may send a command to the set top box device to control what the set top box device sends to a display device (e.g., a television). When the command changes what is sent to the display device, the set top box device may implement the command by accessing a network to have selected media content sent to the set top box device so that the set top box device can send the selected media content to the display device.

The portable computing device may also allow users to access and display media content from the internet. When a user wants to share particular media content with others, the viewers may have to crowd around a small screen of the portable computing device or pass the portable computing device around and display the media content on the portable computing device multiple times.

DETAILED DESCRIPTION

Figure 1:
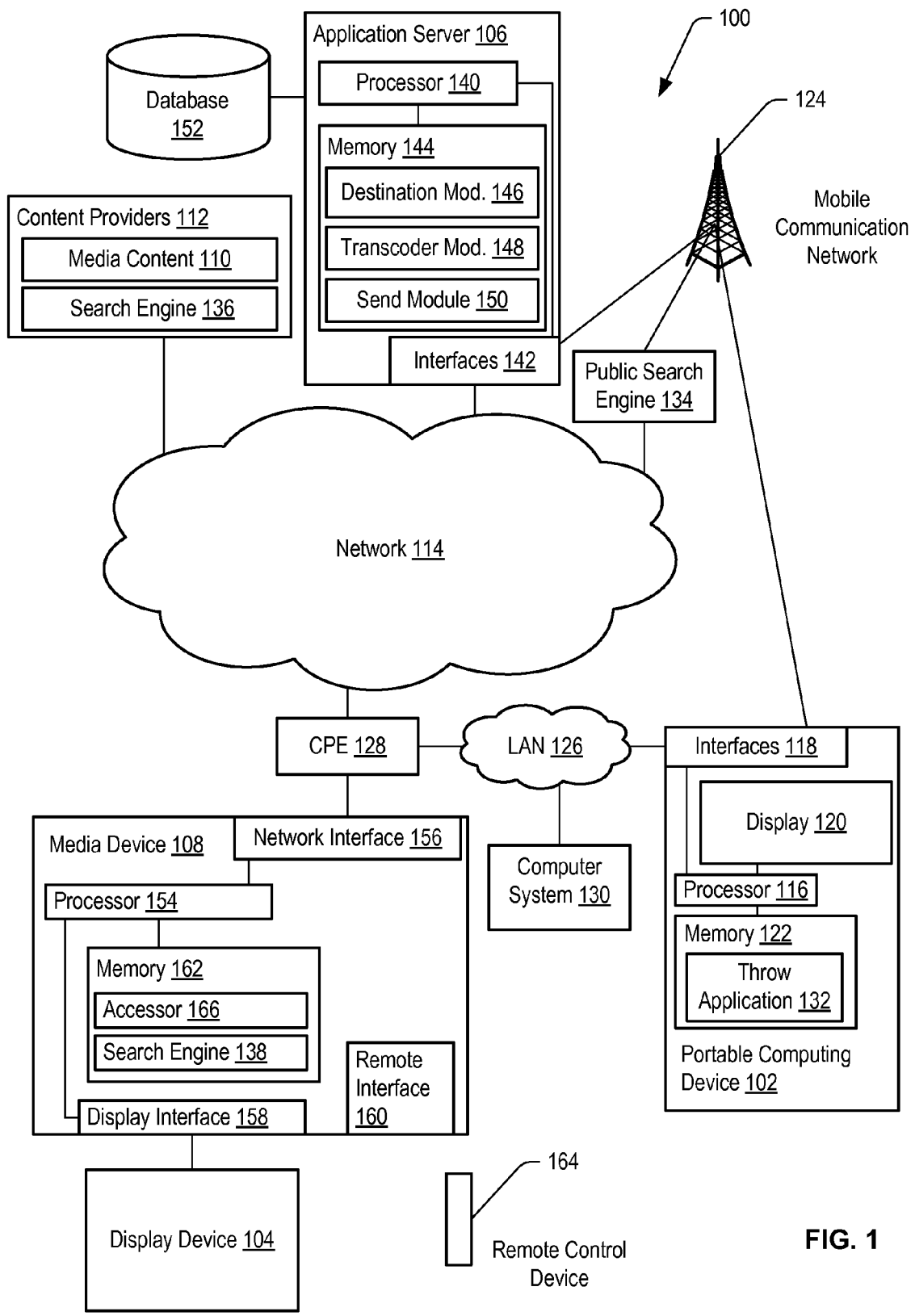
FIG. 1 is a block diagram of an embodiment of a system to send media content selected using a portable computing device to a display device external to the portable computing device.

A user of a portable computing device may use a throw application on the portable computing device to play media content selected using the portable computing device on a display device external to the portable computing device. The portable computing device generates a message to an application server that includes a network address of the media content. The application server generates at least one command executable by the media device coupled to the external display device that enables the media device to access the media content and to send the media content to the external display device when a format of the media content is playable by the media device. The application server transcodes the media content to a format playable by the media device and sends the transcoded media content to the media device when the format of the media content is not playable by the media device. The media device sends the transcoded media content to the external display device.

In a particular embodiment, a computer-implemented method includes identifying, at a portable computing device, media content that is accessible from a remote computing device via a network. The method includes receiving user input associated with a particular media content item of the identified media content. The user input indicates selection of a send media to a second device option associated with the particular media content item. The method includes generating a message in response to the user input, wherein the message includes information identifying the particular media content item. The method also includes sending the message from the portable computing device to an application server that provides media content to a set top box device. In response to the message, the application server sends information to the second device that causes the set top box device to automatically play the particular media content item.

In a particular embodiment, a system includes a processor of an application server and a memory accessible to the processor. The memory includes instructions executable by the processor to receive a message from a portable computing device. The message includes information identifying a network address of a particular media content item. The memory includes instructions executable by the processor to identify a particular set top box device associated with the portable computing device. The memory includes instructions executable by the processor to determine whether the particular set top box device is able to play the particular media content item based on a format of the particular content item. The memory also includes instructions executable by the processor to send at least one command to the particular set top box device when the set top box device is able to play the particular media content item based on the format. The at least one command causes the particular set top box device to access the particular media content item at the network address and to play the particular media content item.

In a particular embodiment, a non-transitory computer-readable storage medium includes instructions, that when executed by a processor, cause the processor to receive at least one command from an application server via a network. The message includes information identifying a network address of a particular media content item. The non-transitory computer-readable storage medium also includes instructions, that when executed by the processor, cause the processor to implement the at least one command to access the media content item at the network address via a public network and send the media content item to a display device.

FIG. 1 is a block diagram of a particular embodiment of a system 100 to send media content selected using a portable computing device 102 to a display device 104 external to the portable computing device 102. When a user of the portable computing device 102 enters a command to the portable computing device 102 to show a particular media content item on the display device 104, the portable computing device 102 may send a message to an application server 106. The message may include a network address of the particular media content item.

The application server 106 may send at least one command to a media device 108 associated with the display device 104 when the particular media content item is in a format that the media device 108 is able to play. The at least one command may instruct the media device 108 to access the particular media content item at the network address and to send the particular media content item to the display device 104. The media device 108 may be a set top box device or another device that receives media content 110 from one or more content providers 112 via a network 114. The media device 108 may be an integral component of the display device 104 or a separate component. The media content 110 may include video content, audio content, or both. For example, the media content 110 may include television programming, video-on-demand content, pay-per-view content, music, speech, video games, internet content, or other types of media.

The application server 106 may access the particular media content item, transcode the particular media content item to a format playable by the media device 108, and send the particular media content item to the media device 108 in the format playable by the media device 108 when the particular media content item at the network address is not in a format playable by the media device 108. The media device 108 may send the particular media content item to the display device 104.

The portable computing device 102 may be a mobile communication device, a tablet computer, a personal digital assistant, a lap top computer, or another type of communication device. The portable computing device 102 may include a processor 116. The processor 116 may be coupled to one or more interfaces 118, a display 120, and a memory 122.

The one or more interfaces 118 may enable the portable computing device 102 to communicate via the network 114, via a mobile communication network 124, via a local area network (LAN) 126 established by customer premises equipment (CPE) 128, or combinations thereof. The CPE 128 may facilitate communications to and from the network 114 and the LAN 126. The CPE 128 may include a router, a wireless router, a local area network device, a modem (e.g., a digital subscriber line (DSL) modem or a cable modem), a residential gateway, another communication facilitator, or combinations thereof. The portable computing device 102 may be associated with a service provider that enables the portable computing device 102 to have access to the mobile communication network 124. The portable computing device 102 may provide a user name, a password, other identifying credentials, or combinations thereof to gain access to the LAN 126. The LAN 126 may be a wireless local area network.

The one or more interfaces 118 may also include a port that enables the portable computing device 102 to be directly coupled to a device (e.g., a computer system 130, such as a desktop computer or a laptop computer) via a connector. Access to the device and to the network 114 may be provided to the portable computing device 102 via the connector.

The display 120 may provide a visual interface to the user of the portable computing device 102. In some embodiments, the display 120 may be a touch screen that enables user input to the portable computing device 102. In some embodiments, the portable computing device 102 may include a keyboard, keypad, or other type of user interface in addition to, or in lieu of, the touch screen to enable user input.

The memory 122 may store data. The data may include settings for the portable computing device 102, media content, and other information. The data in the memory 122 may also include instructions executable by the processor 116 to perform tasks. The instructions may include one or more applications to perform particular tasks. For example, the memory 122 may include a throw application 132 that enables the user to send media content selected by the user to an external display device, such as the display device 104.

The user of the portable computing device 102 may run the throw application 132 by selecting an icon that represents the throw application 132 on the display 120. When the processor 116 executes the throw application 132, the user may be prompted to select a particular media content item. The user may be prompted to select the particular media content item from a listing of available media content presented on the display 120. The listing of available media content may be a listing of at least a portion of media content available from a service or from one or more devices (e.g., the one or more content providers 112, the media device 108, the computer system 130, the portable computing device 102, or combinations thereof). The listing may be the result of a search performed by at least one search engine based on search terms entered by the user of the portable computing device 102. The listing may present media content available from a service provider that provides service for the portable computing device 102, provides service for the media device 108 to receive the media content, or both. The listing may also present media content available from a source other than the service provider (e.g., media content available from YOUTUBE®).

The search engine used by the throw application 132 may be selectable by the user (e.g., the search engine may be selected from a list of available search engines, or the search engine may be a default or selected search engine saved in settings of the portable computing device 102). The search engine may be a publically available search engine 134 (e.g., GOOGLE® and BINGO), a search engine 136 that searches the media content 110 available from one or more of the content providers 112 (e.g., a search engine of a media service, such as YOUTUBE®, or a search engine for content available from a service provider for the portable computing device 102, the media device 108, or both), a local search engine associated with a particular device associated with the portable computing device 102 (e.g., a search engine 138 associated with the media device 108, a search engine associated with the computer system 130, or a search engine associated with the portable computing device 102), or combinations thereof. The available media content in the listing may include, but is not limited to, media content from the computer system 130, media content available in the memory 122 of the portable computing device 102, media content available from a memory 162 of the media device 108, media content available on an external digital video recorder, the media content 110 available from the content providers 112, or combinations thereof. The media content 110 available from the content providers 112 may include media content from media services not associated with the service providers for the portable computing device 102, the media device 108, or both (e.g., YOUTUBE® videos and media content from NETFLIX®) and media content from the service provider for the portable computing device 102, the media device 108, or both. The media content from the service providers may include, but is not limited to, media included in electronic program guide listings, media content based on a service tier associated with the user (e.g., premium programs such as programming available from HBO® or SHOWTIME®), media content available as media-on-demand, and content available as pay-per-view programming.

Each entry in the listing of available media content may be associated with a network address that identifies where the media content item related to the entry is located. The user may scroll through the available media content of the listing.

When the user pauses on a particular entry, summary information for the entry may be displayed. The summary information may be obtained from metadata associated with the particular entry or from other sources. The summary information may include, but is not limited to, an image or video clip associated with the particular media content item, a cost to view the particular media content item, a title of the particular media content item, a length of the particular media content item, a plot summary of the particular media content item, a review of the particular media content item, actors or artists associated with the particular media content item, other data associated with the particular media content item, or combinations thereof. Settings for the throw application 132 may cause the throw application 132 to emphasize media content that requires payment of a fee. For example, pay-per-view content and video-on-demand content may be displayed in a particular color and may be placed at a top (or a bottom) of the listing of available media content.

The user of the portable computing device 102 may select a particular media content item from the listing of available media content. For example, the user may highlight the particular media content item on the display 120 and tap on the particular media content item to select the particular media content item or hit an "enter" key. When the user selects the particular media content item, the throw application 132 may present options to the user. The options may include an option to return to the listing of available media content (e.g., a "return" option), an option to play the particular media content item on the portable computing device 102 (e.g., a "play" option), and an option to send the particular media content item to an external display device (e.g., a "throw" option). When the user chooses the option to return to the listing of available media content, the available media content listing is sent to the display 120.

When the user of the portable computing device 102 chooses the option to play the particular media content item on the portable computing device 102, the throw application 132 may send a message to the application server 106 that includes the network address of the particular media content item and information that the particular media content item is to be played by the portable computing device 102. The application server 106 may determine whether the particular media content item is in a format that the portable computing device 102 can play. When the particular media content item is in a format that the portable computing device 102 can play, the application server 106 may send at least one command to the portable computing device 102. The at least command may be in an extensible markup language (XML) format that is executable by the processor 116. The at least one command may be executed by the processor 116 when received to access the network address of the particular media content item and play the particular media content item. When the particular media content item is not in a format that the portable computing device 102 can play, the application server 106, may access the particular media content item at the network address and transcode the particular media content item to a format that the portable computing device 102 can play. The transcoded media content may be sent to and played on the portable computing device 102. Alternately, the portable computing device 102 may access the address and play the particular media content item without communicating with the application server 106.

Settings of the throw application 132 may allow the application server 106 to determine which external display device will receive the particular media content item when the user of the portable computing device 102 selects the option to send the particular media content item to an external display device. Allowing the application server 106 to determine the external display device that will receive the particular media content item may be a default setting for the throw application 132. When the application server 106 is to determine which external display device will receive the particular media content item, the throw application 132 may cause the processor 116 to send a message that includes the network address of the particular media content item to the application server 106.

Settings of the throw application 132 may cause the processor 116 to send to the display 120 a listing of one or more external display devices (e.g., a family room television or a bedroom television). Entries in the listing may be stored in a table in the memory 122. For each external display device in the table, the table may include a network address for a media device that provides media content to the external display device. When the user of the portable computing device 102 selects a particular external display device from the listing, the throw application 132 causes the processor 116 to send a message to the application server 106 that includes the network address of the particular media content item and a network address of the particular media device that provides media content to the particular external display device. The listing of one or more external display devices may also include an entry to select the external display device based on a network connection when the portable computing device 102 accesses the application server 106 via the network 114. When the user selects the entry to select the device based on the network connection, the throw application 132 may cause the processor 116 to send a message to the application server 106 that includes the network address of the particular media content item.

The application server 106 may receive a message from the portable computing device 102 sent by the processor 116 executing the throw application 132. The application server 106 may process the message to provide the particular media content item identified in the message to an appropriate destination. The particular media content item may be media content from a particular device associated with the portable computing device 102 (e.g., the portable computing device 102, the computer system 130, and the media device 108); media content provided by the service provider associated with the portable computing device 102, the media device 108, or both; or media content from a content provider of the content providers 112 not associated with the service provider (e.g., media content provided by YOUTUBE®). The appropriate destination may be the portable computing device 102 or an external display device (e.g., the display device 104). The message may identify the appropriate destination or the application server 106 may identify the appropriate destination. The application server 106 may include a processor 140. The processor 140 may be coupled to interfaces 142 and a memory 144. The interfaces 142 may enable the application server 106 to communicate via the mobile communication network 124 and the network 114.

The memory 144 may include instructions executable by the processor 140. For purposes of description, instructions are illustrated in FIG. 1 as organized in functional modules to perform particular tasks. The modules may include a destination module 146, a transcode module 148, and a send module 150.

When the application server 106 receives the message from the portable computing device 102, the processor 140 may use the destination module 146 to determine a destination for the particular media content item identified in the message. The destination module 146 may parse the message to determine whether the message includes the destination. When the message does not include the destination, the processor 140 may use the destination module 146 to determine whether the message was received via the mobile communication network 124 or via the network 114 from a particular CPE (e.g., the CPE 128). When the message was received via the mobile communication network 124, the processor 140 may send a request to a database 152 for a listing of media devices that are associated with the portable computing device 102 that sent the message. When the listing includes a single media device (e.g., the media device 108), the destination may be the single media device. When the listing includes more than one media device, the destination module 146 may cause the processor 140 to send a query to the portable computing device 102 that prompts the user to specify a particular destination for the particular media content item from the listing. The listing may present information regarding the destination in terms of media devices or in terms of display devices that are associated with the media devices, or both. The destination for the particular media content item may be determined from the user response to the query.

When the message does not include the destination and the message was received via the network 114 from a particular CPE (e.g., the CPE 128), the processor 140 may send a request to the database 152 for a listing of media devices that are associated with the particular CPE. Basing the destination on the particular CPE may allow the destination to be an external display device associated with the user (e.g., a display device in the user's residence when the CPE 128 associated with the user) or an external display device that is not associated with the user except by location (e.g., a display device in a residence of a friend of the user when the user accesses the application server 106 from the portable computing device 102 via a particular CPE associated with the residence and not otherwise associated with the user). When the listing includes a single media device (e.g., the media device 108), the destination device may be the single media device. When the listing includes more than one media device, the destination module 146 may cause the processor 140 to send a query to the portable computing device 102 that prompts the user to specify a particular destination from the listing. The listing may present information regarding the destination in terms of media devices or in terms of display devices that are associated with the media devices, or both. The destination for the particular media content item may be determined from the user response to the query. When the destination module 146 cannot determine the destination based on the particular CPE, the destination module 146 may determine the destination based on the portable computing device 102 that sent the message, as described above. When the destination module 146 cannot determine the destination based on parsing the message, based on the portable computing device 102, or based on the particular CPE that forwarded the message to the application server 106, the processor 140 may send an error message to the portable computing device 102 that informs the user that the particular media content item could not be thrown to an external display device.

After determining the destination using the destination module 146, the processor 140 may execute the transcode module 148. The transcode module 148 may cause the processor 140 to access the media at the network address included in the message from the portable computing device 102. The transcode module 148 may cause the processor 140 to determine a format of the particular media content item. The transcode module 148 may cause the processor 140 to determine whether the destination can accommodate media content in the format. When the determination is that the destination cannot play media content in the format, the transcode module 148 may cause the processor 140 to access the particular media content item at the network address, transcode the particular media content item into a format that the destination can play, and forward the transcoded media content to the destination. When the transcoded media content is sent the destination, the application server 106 may send a success message to the portable computing device 102.

When the determination is that the particular media content item is in a format that the destination can play, the transcode module 148 may cause the processor 140 to execute the send module 150. When the processor 140 executes the send module 150, the processor 140 may generate at least one command for the destination (e.g., the portable computing device 102 or the particular media device). The at least one command may instruct the destination to access the particular media content item at the network address and play the particular media content item. The command may be in an extensible markup language (XML) format. The send module 150 may cause the processor to send the at least one command to the destination. When the at least one command is sent to the destination, the application server 106 may send a success message to the portable computing device 102.

The application server 106 may send the transcoded media content or the at least one command to the destination. The destination may be the portable computing device 102 when the message sent to the application server 106 identifies the portable computing device 102 as the destination. Otherwise, the destination may be an external display device. For example, the external display device may be the display device 104 coupled to the media device 108.

The media device 108 may include a processor 154. The processor 154 may be coupled to a network interface 156, a display interface 158, a remote interface 160 and a memory 162. The network interface 156 may enable the media device 108 to send and receive information via the network 114, the LAN 126, or both. The display interface 158 may enable the media device 108 to send and receive information from the display device 104. The remote interface 160 may enable the media device 108 to receive user commands from a remote control device 164 or other input device.

The memory 162 may store data. The data may include settings for the media device 108, media content, and other information. The data may in the memory 162 may also include instructions executable by the processor 154 to perform tasks. The instructions may include one or more applications to perform particular tasks. For example, the memory 162 may include a search engine 138 to search for media content stored in the memory 162 and an accessor 166 to access media content thrown to the media device 108.

The accessor 166 may include instructions executable by the processor 154 to execute one or more commands received from the application server 106. The one or more commands received from the application server 106 may instruct the processor 154 to access the particular media content item thrown from the portable computing device 102 at the network address and send the particular media content item to the display device 104 via the display interface 158.

The user of the portable computing device 102 may use the throw application 132 to play media content selected using the portable computing device 102 on the display device 104, which is external to the portable computing device 102. The portable computing device 102 may generate a message to the application server 106 that includes a network address of the media content. The application server 106 may generate at least one command executable by the media device 108 coupled to the display device 104 that enables the media device 108 to access the media content and to send the media content to the display device 104 when the format of the media content is playable by the media device 108. The application server 106 may transcode the media content to a format playable by the media device 108 and may send the transcoded media content to the media device 108 when the format of the media content is not playable by the media device 108. The media device may send the transcoded media content to the display device 104.

Figure 2:
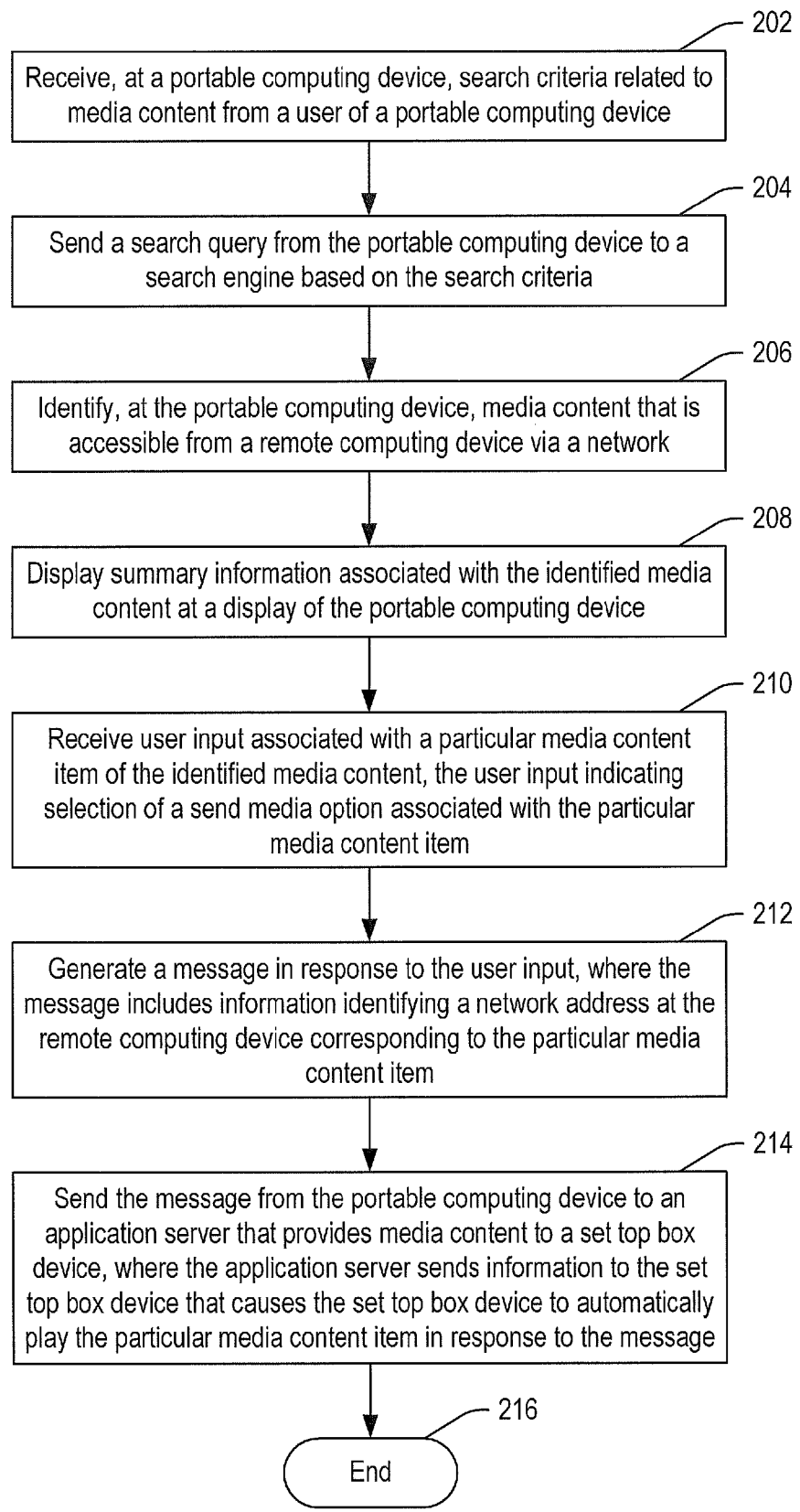
FIG. 2 is a flow chart of a first particular embodiment of a method to send media content selected using a portable computing device to a display device external to the portable computing device.

Referring to FIG. 2, a flow chart of a first particular embodiment of a method to send media content selected using a portable computing device to a display device external to the portable computing device is shown. The method may be performed by a portable computing device (e.g., the portable computing device 102 depicted in FIG. 1).

At 202, the portable computing device may receive search criteria related to media content from a user of the portable computing device. The portable computing device may send a search query to a search engine based on the search query, at 204. The search engine may be a public search engine (e.g., GOOGLE® or BINGO), a private search engine associated with a content provider or particular device.

The portable computing device may identify media content that is accessible from a remote computing device, at 206. The identified media content may be listed on a display of the portable computing device. The identified media content may include results of the search query. The identified media content may include a listing of media content stored in the portable computing device, a listing of media content owned or currently available to the user of the portable computing device, a listing of a subset of media content available from a content provider (e.g., a listing by category, a listing by genre, or a listing of titles that start with a particular letter), a listing of all media content available from the content provider, or combinations thereof. The identified media content may include media content stored at a device accessible via a network (e.g., media content recorded by a media recorder, such as a digital video recorder (DVR), a computer system coupled to the network, or combinations thereof).

At 208, summary information associated with the identified media content may be displayed on the display of the portable computing device when the user highlights particular media content in a list of media content presented on the display. The summary information may be obtained from metadata of the media content or from another source.

At 210, user input associated with a particular media content item of the identified media content may be received. The portable computing device may display a play option that is selectable to play the particular media content item on the portable computing device. The portable computing device may also, or in the alternative, display a send media option that is selectable to throw the particular media content item to a display device external to the portable computing device. When the user selects the play option, the portable computing device may receive the particular media content item from an application server. Alternately, the portable computing device may receive at least one command that enables the portable computing device to access the network address of the particular media content item and to play the particular media content item on the portable computing device. The portable computing device may access the particular media content item directly from the network address (i.e., without the application server).

When the user provides user input selecting the send media option, the portable computing device may generate a message in response to the user input, at 212. The message may include information identifying a network address at the remote computing device corresponding to the particular media content item. The network address may identify the particular media content in a format that is playable by the device to receive the particular media content item.

At 214, the message is sent from the portable computing device to an application server that provides media content to a set top box device. The application server sends information to the set top box device that causes the set top box device to automatically play the particular media content item in response to the message. The method ends at 216.

Figure 3:
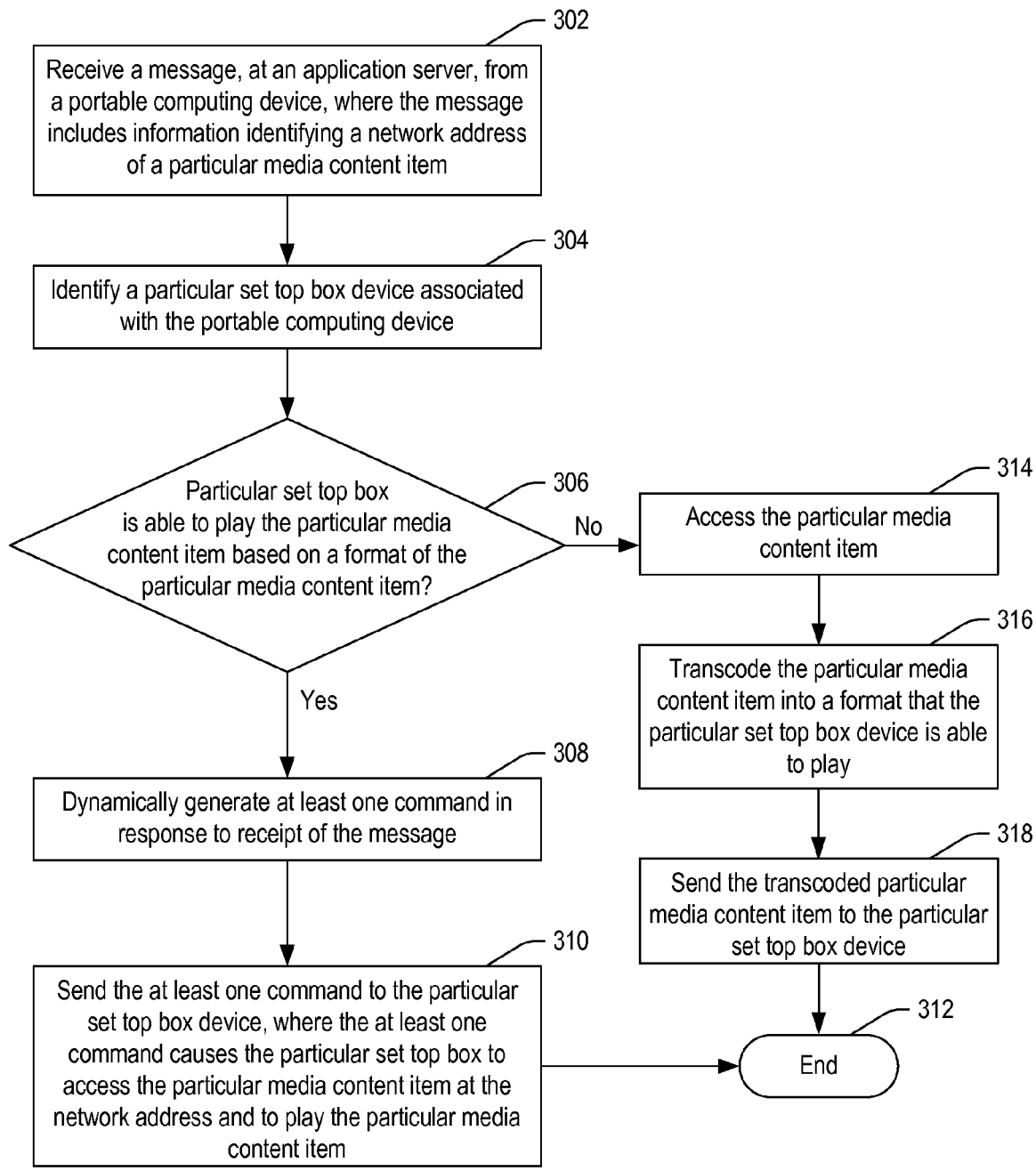
FIG. 3 is a flow chart of a second particular embodiment of a method to send media content selected using a portable computing device to a display device external to the portable computing device.

Referring to FIG. 3, a flow chart of a second particular embodiment of a method to send media content selected using a portable computing device to a display device external to the portable computing device is shown. The method may be performed by an application server (e.g., the application server 106 depicted in FIG. 1).

At 302, the application server may receive a message from a portable computing device (e.g., the portable computing device 102 depicted in FIG. 1). The message may include information identifying a network address of a particular media content item.

A particular set top box device associated with the portable computing device may be identified, at 304. In an embodiment, the particular set top box device may be identified based on location information associated with the portable computing device. For example, the portable communication device may access the application server via a CPE at a residence. The application server may identify the CPE from the message. The application server may access a database to identify one or more set top box devices associated with the CPE. When a single set top box device is associated with the CPE, the identified particular set top box device may be the single set top box device. When more than one set top box device is associated with the CPE, the application server may send a graphical user interface to the portable communication device that enables the user to select the particular display device (e.g., a television in a family room or a television in a bedroom).

In another embodiment, the particular set top box device may be identified based on a user account associated with the portable computing device. For example, the application server may access a database that includes user account information that identifies the portable computing device and one or more other devices associated with the portable computing device. When a single set top box device is associated with the portable communication device in the database, the single set top box device is identified as the particular set top box device. When more than one set top box device is associated with the portable computing device, the application server may send a graphical user interface to the portable computing device that enables the user to select the particular display device (e.g., a television in a family room or a television in a bedroom) to show the particular content item.

In another embodiment, the particular set top box device may be identified based on information in the message. When the user of the portable communication device chooses to throw the particular media content, the portable communication device may present a graphical user interface that shows selectable options. Each selectable option may describe a display device that can show the particular media content. The selectable options may be retrieved from the memory of the portable communication device. When the user selects one of the selectable options, the message sent to the application server may include information (e.g., a network address) that identifies the set top box device associated with the display device corresponding to the selected option.

At 306, a determination may be made of whether the particular set top box device is able to play the particular media content item based on a format of the particular media content item. The application server may communicate with the particular set top box device to determine whether the particular set top box device has the appropriate resources to play the particular media content.

When the particular set top box device is able to play the particular media content based on the format of the particular media content, the application server may dynamically generate at least one command in response to receipt of the message, at 308. The at least one command may be generated as an extensible markup language file. The at least one command may be sent to the particular set top box device, at 310. The at least one command may be implemented by the particular set top box device. Implementation of the at least one command may cause the particular set top box device to access the particular media content item at the network address and to play the particular media content item. When the particular media content item is played, the particular media content item may be sent to a display device coupled to the particular set top box device. The method may end at 312.

When the particular set top box device is not able to play the particular media content based on the format of the particular media content, the application server may access the particular media content item, at 314. The application server may transcode the particular media content item into a format that the particular set top box device is able to play, at 316. The application server may send the transcoded particular media content item to the particular set top box device, 318. The particular set top box may send the particular media content item to the display device coupled to the particular set top box device. The method may end at 312.

Figure 4:
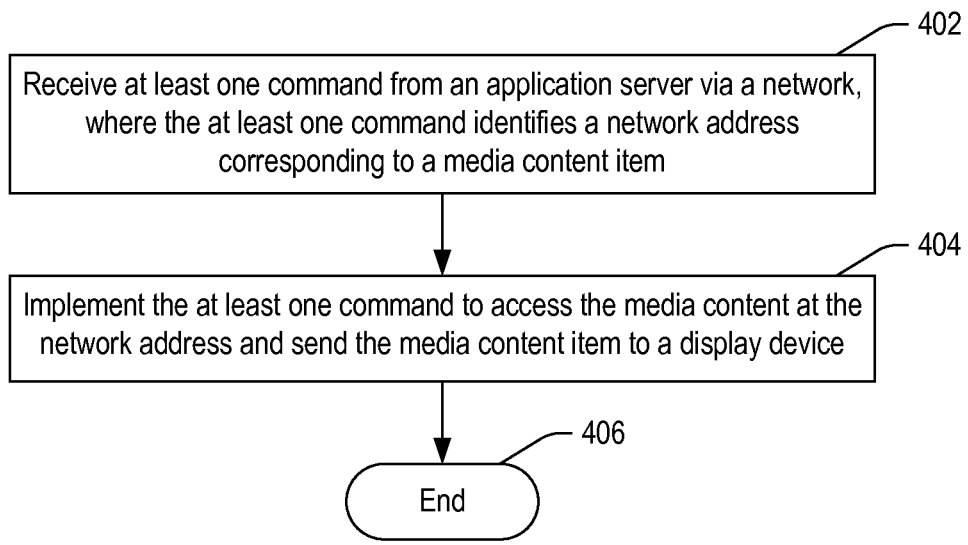
FIG. 4 is a flow chart of a third particular embodiment of a method to send media content selected using a portable computing device to a display device external to the portable computing device.

Referring to FIG. 4, a flow chart of a third particular embodiment of a method to send media content selected using a portable computing device to a display device external to the portable computing device is shown. The method may be performed by a set top box device (e.g., the media device 108 depicted in FIG. 1).

At 402, at least one command may be received at the set top box device from an application server via a network. The network may be a private access network (e.g., a private access network of an Internet Protocol Television (IPTV) network). The at least one command may identify a network address corresponding to a media content item. The at least one command may be received from the application server in response to a send media command received from a portable communication device (e.g., the portable computing device 102 depicted in FIG. 1). The send media command may be sent from the portable communication device when a user selects a send media option shown on a display of the portable communication device.

The set top box device may access the media content item at the network address via a public network in response to implementation of the at least one command, at 404. The set top box device may send the media content to a display device. In an embodiment, the media content may be displayed at the display device without any user input at the set top box device. The method may end at 406.

Figure 5:
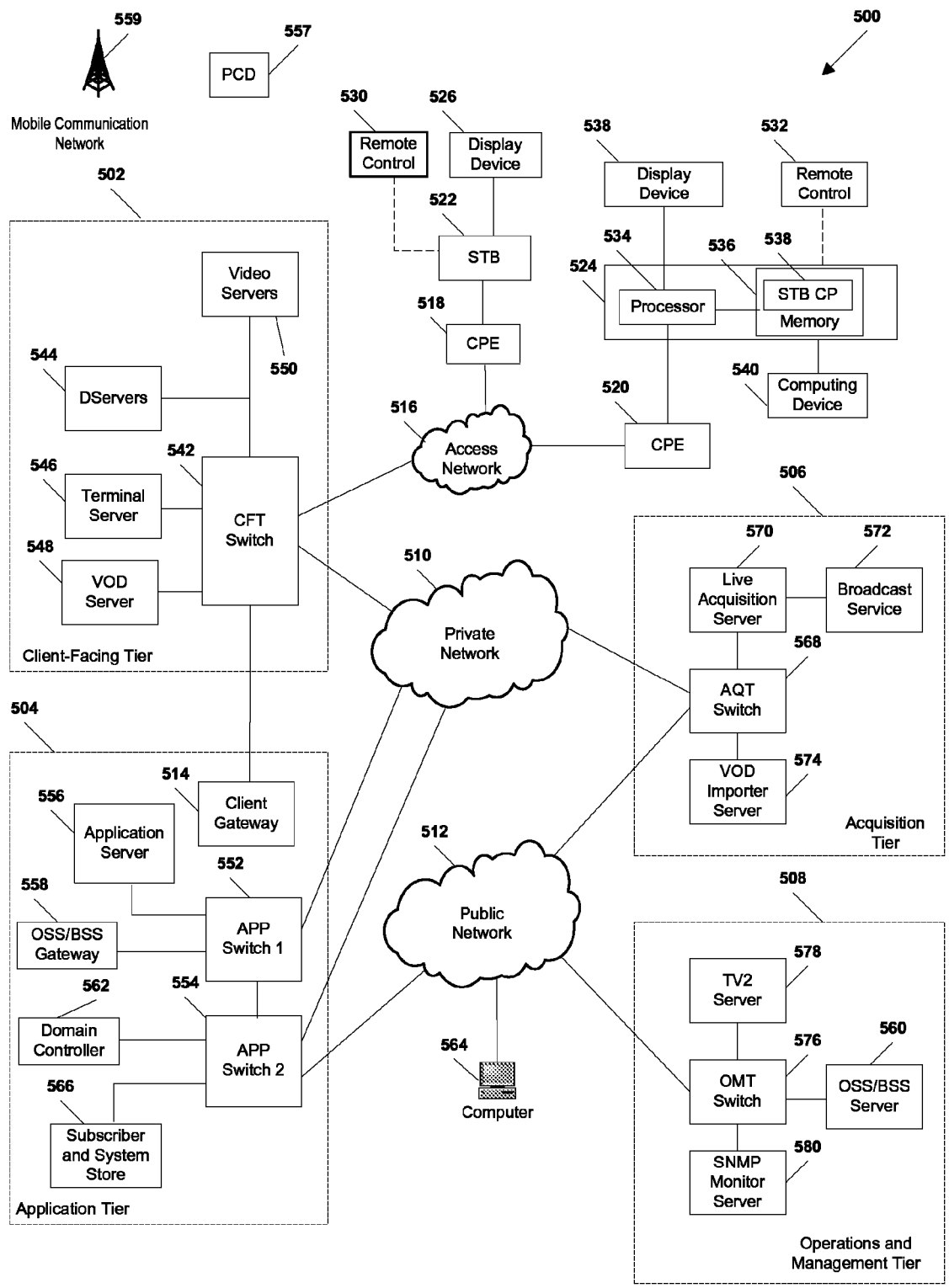
FIG. 5 is a block diagram of an illustrative embodiment of an Internet Protocol Television system.

Referring to FIG. 5, an illustrative embodiment of an Internet Protocol Television (IPTV) system is illustrated and is generally designated 500. As shown, the system 500 can include a client facing tier 502, an application tier 504, an acquisition tier 506, and an operations and management tier 508. Each tier 502, 504, 506, 508 is coupled to a private network 510; to a public network 512, such as the Internet; or to both the private network 510 and the public network 512. For example, the client-facing tier 502 can be coupled to the private network 510. Further, the application tier 504 can be coupled to the private network 510 and to the public network 512. The acquisition tier 506 can also be coupled to the private network 510 and to the public network 512. Additionally, the operations and management tier 508 can be coupled to the public network 512.

As illustrated in FIG. 5, the various tiers 502, 504, 506, 508 communicate with each other via the private network 510 and the public network 512. For instance, the client-facing tier 502 can communicate with the application tier 504 and the acquisition tier 506 via the private network 510. The application tier 504 can communicate with the acquisition tier 506 via the private network 510. Further, the application tier 504 can communicate with the acquisition tier 506 and the operations and management tier 508 via the public network 512. Moreover, the acquisition tier 506 can communicate with the operations and management tier 508 via the public network 512. In a particular embodiment, elements of the application tier 504, including, but not limited to, a client gateway 514, can communicate directly with the client-facing tier 502.

The client-facing tier 502 can communicate with user equipment via an access network 516, such as an Internet Protocol Television (IPTV) access network. In an illustrative embodiment, customer premises equipment (CPE) 518, 520 can be coupled to a local switch, router, or other device of the access network 516. The client-facing tier 502 can communicate with a first representative set top box device 522 at a first customer premise via the first CPE 518 and with a second representative set top box device 524 at a second customer premise via the second CPE 520. The CPE 518, 520 can include routers, local area network devices, modems, such as digital subscriber line (DSL) modems, any other suitable devices for facilitating communication between a set top box device and the access network 516, or any combination thereof.

In a particular embodiment, the client-facing tier 502 can be coupled to the CPE 518, 520 via fiber optic cables. Alternatively, the CPE 518, 520 can be digital subscriber line (DSL) modems that are coupled to one or more network nodes via twisted pairs, and the client-facing tier 502 can be coupled to the network nodes via fiber-optic cables. Each set top box device 522, 524 can process data received via the access network 516, via an IPTV software platform, such as Microsoft® TV IPTV Edition.

The first set top box device 522 can be coupled to a first external display device, such as a first television monitor 526, and the second set top box device 524 can be coupled to a second external display device, such as a second television monitor 528. Moreover, the first set top box device 522 can communicate with a first remote control 530, and the second set top box device 524 can communicate with a second remote control 532. The set top box devices 522, 524 can include IPTV set top box devices; video gaming devices or consoles that are adapted to receive IPTV content; personal computers or other computing devices that are adapted to emulate set top box device functionalities; any other device adapted to receive IPTV content and transmit data to an IPTV system via the access network 516; or any combination thereof.

In an exemplary, non-limiting embodiment, each set top box device 522, 524 can receive data, video, or any combination thereof, from the client-facing tier 502 via the access network 516 and render or display the data, video, or any combination thereof, at the display device 526, 528 to which it is coupled. In an illustrative embodiment, the set top box devices 522, 524 can include tuners that receive and decode television programming signals or packet streams for transmission to the display devices 526, 528. Further, the set top box devices 522, 524 can include a STB processor 534 and a STB memory device 536 that is accessible to the STB processor 534. In one embodiment, a computer program, such as the STB computer program 538, can be embedded within the STB memory device 536. In another illustrative embodiment, a user computing device 540, such as a personal computer, laptop or local server, can be coupled to a set top box device, such as the first representative set top box device 524, for example, via a universal serial bus (USB) connection or other connection.

In an illustrative embodiment, the client-facing tier 502 can include a client-facing tier (CFT) switch 542 that manages communication between the client-facing tier 502 and the access network 516 and between the client-facing tier 502 and the private network 510. As illustrated, the CFT switch 542 is coupled to one or more data servers, such as D-servers 544, that store, format, encode, replicate, or otherwise manipulate or prepare video content for communication from the client-facing tier 502 to the set top box devices 522, 524. The CFT switch 542 can also be coupled to a terminal server 546 that provides terminal devices with a connection point to the private network 510. In a particular embodiment, the CFT switch 542 can be coupled to a video-on-demand (VOD) server 548 that stores or provides VOD content imported by the IPTV system 500. Further, the CFT switch 542 is coupled to one or more video servers 550 that receive video content and transmit the content to the set top boxes 522, 524 via the access network 516.

In an illustrative embodiment, the client-facing tier 502 can communicate with a large number of set top boxes, such as the representative set top boxes 522, 524 over a wide geographic area, such as a regional area, a metropolitan area, a viewing area, a designated market area or any other suitable geographic area, market area, or subscriber or customer group that can be supported by networking the client-facing tier 502 to numerous set top box devices. In a particular embodiment, the CFT switch 542, or any portion thereof, can include a multicast router or switch that feeds one or more video streams from a video server to multiple set top box devices.

As illustrated in FIG. 5, the application tier 504 can communicate with both the private network 510 and the public network 512. The application tier 504 can include a first application tier (APP) switch 552 and a second APP switch 554. In a particular embodiment, the first APP switch 552 can be coupled to the second APP switch 554. The first APP switch 552 can be coupled to an application server 556 and to an OSS/BSS gateway 558. In a particular embodiment, the application server 556 can provide applications to the set top box devices 522, 524 via the access network 516, which enable the set top box devices 522, 524 to provide functions, such as display, messaging, processing of IPTV data and VOD material, etc. In a particular embodiment, the OSS/BSS gateway 558 includes operation systems and support (OSS) data, as well as billing systems and support (BSS) data. In one embodiment, the OSS/BSS gateway 558 can provide or restrict access to an OSS/BSS server 560 that stores operations and billing systems data.

In an embodiment, the application server 556 may receive a message from a personal computing device (PCD) 557. The PCD 557 may be a mobile communication device, a tablet computer, a personal digital assistant, a lap top computer, or other type of communication device. In some embodiments, the PCD 557 may be connected to a local area network established by one of the CPEs 518 or 520, and the message may be sent to the application server 556 via a combination of the access network 516, the private network 510, the public network 512, or a combination thereof. In some embodiments, the PSD 557 may send the message to the application server 556 via a mobile communication network 559.

The message may identify a network address of a particular media content item to be sent to a particular display device. A particular set top box associated with the particular display device may be specified in the message, or the application server 556 may determine the particular set top box from the OSS/BSS server 560 based on the PCD 557, based on the particular CPE used to send the message to the application server 556, or both. The application server 556 may determine whether the particular media content item is in a format that can be played by the particular set top box. When the particular media content is in a format that can be played by the particular set top box, the application server 556 may send at least one command to the particular set top box. The at least one command may be in an extensible markup language format. The at least one command may cause the particular set top box to access the network address of the particular media content item and send the particular media content item to the particular display device. When the particular media content is not in a format that can be played by the particular set top box, the application server 556 may have the network address of the particular media content item accessed, may have the particular media content item transcoded to a format playable by the particular set top box, and may have the transcoded particular media content item sent to the particular set top box so that the set top box can send the particular media content item to the particular display device.

The second APP switch 554 can be coupled to a domain controller 562 that provides Internet access, for example, to users at their computers 564 via the public network 512. For example, the domain controller 562 can provide remote Internet access to IPTV account information, e-mail, personalized Internet services, or other online services via the public network 512. In addition, the second APP switch 554 can be coupled to a subscriber and system store 566 that includes account information, such as account information that is associated with users who access the IPTV system 500 via the private network 510 or the public network 512. In an illustrative embodiment, the subscriber and system store 566 can store subscriber or customer data and create subscriber or customer profiles that are associated with IP addresses of corresponding set top box devices 522, 524.

In a particular embodiment, the application tier 504 can include a client gateway 514 that communicates data directly to the client-facing tier 502. In this embodiment, the client gateway 514 can be coupled directly to the CFT switch 542. The client gateway 514 can provide user access to the private network 510 and the tiers coupled thereto. In an illustrative embodiment, the set top box devices 522, 524 can access the IPTV system 500 via the access network 516, using information received from the client gateway 514. User devices can access the client gateway 514 via the access network 516, and the client gateway 514 can allow such devices to access the private network 510 once the devices are authenticated or verified. Similarly, the client gateway 514 can prevent unauthorized devices, such as hacker computers or stolen set top box devices from accessing the private network 510, by denying access to these devices beyond the access network 516.

For example, when the first representative set top box device 522 accesses the client-facing tier 502 via the access network 516, the client gateway 514 can verify subscriber information by communicating with the subscriber and system store 566 via the private network 510. Further, the client gateway 514 can verify billing information and status by communicating with the OSS/BSS gateway 558 via the private network 510. In one embodiment, the OSS/BSS gateway 558 can transmit a query via the public network 512 to the OSS/BSS server 560. After the client gateway 514 confirms subscriber and/or billing information, the client gateway 514 can allow the set top box device 522 to access IPTV content and VOD content at the client-facing tier 502. If the client gateway 514 cannot verify subscriber information for the set top box device 522, e.g., because it is connected to an unauthorized twisted pair, the client gateway 514 can block transmissions to and from the set top box device 522 beyond the access network 516.

As indicated in FIG. 5, the acquisition tier 506 includes an acquisition tier (AQT) switch 568 that communicates with the private network 510. The AQT switch 568 can also communicate with the operations and management tier 508 via the public network 512. In a particular embodiment, the AQT switch 568 can be coupled to a live acquisition server 570 that receives or acquires television content, movie content, advertisement content, other video content, or any combination thereof, from a broadcast service 572, such as a satellite acquisition system or satellite head-end office. In a particular embodiment, the live acquisition server 570 can transmit content to the AQT switch 568, and the AQT switch 568 can transmit the content to the CFT switch 542 via the private network 510.

In an illustrative embodiment, content can be transmitted to the D-servers 544, where it can be encoded, formatted, stored, replicated, or otherwise manipulated and prepared for communication from the video server(s) 550 to the set top box devices 522, 524. The CFT switch 542 can receive content from the video server(s) 550 and communicate the content to the CPE 518, 520 via the access network 516. The set top box devices 522, 524 can receive the content via the CPE 518, 520, and can transmit the content to the television monitors 526, 528. In an illustrative embodiment, video or audio portions of the content can be streamed to the set top box devices 522, 524.

Further, the AQT switch 568 can be coupled to a video-on-demand importer server 574 that receives and stores television or movie content received at the acquisition tier 506 and communicates the stored content to the VOD server 548 at the client-facing tier 502 via the private network 510. Additionally, at the acquisition tier 506, the video-on-demand (VOD) importer server 574 can receive content from one or more VOD sources outside the IPTV system 500, such as movie studios and programmers of non-live content. The VOD importer server 574 can transmit the VOD content to the AQT switch 568, and the AQT switch 568, in turn, can communicate the material to the CFT switch 542 via the private network 510. The VOD content can be stored at one or more servers, such as the VOD server 548.

When users issue requests for VOD content via the set top box devices 522, 524, the requests can be transmitted over the access network 516 to the VOD server 548, via the CFT switch 542. Upon receiving such requests, the VOD server 548 can retrieve the requested VOD content and transmit the content to the set top box devices 522, 524 across the access network 516, via the CFT switch 542. The set top box devices 522, 524 can transmit the VOD content to the television monitors 526, 528. In an illustrative embodiment, video or audio portions of VOD content can be streamed to the set top box devices 522, 524.

FIG. 5 further illustrates that the operations and management tier 508 can include an operations and management tier (OMT) switch 576 that conducts communication between the operations and management tier 508 and the public network 512. In the embodiment illustrated by FIG. 5, the OMT switch 576 is coupled to a TV2 server 578. Additionally, the OMT switch 576 can be coupled to an OSS/BSS server 560 and to a simple network management protocol (SNMP) monitor 580 that monitors network devices within or coupled to the IPTV system 500. In a particular embodiment, the OMT switch 576 can communicate with the AQT switch 568 via the public network 512.

In an illustrative embodiment, the live acquisition server 570 can transmit content to the AQT switch 568, and the AQT switch 568, in turn, can transmit the content to the OMT switch 576 via the public network 512. In this embodiment, the OMT switch 576 can transmit the content to the TV2 server 578 for display to users accessing the user interface at the TV2 server 578. For example, a user can access the TV2 server 578 using a personal computer (PC) 564 coupled to the public network 512.

A user of a portable computing device may use a throw application on the portable computing device to play media content selected using the portable computing device on a display device external to the portable computing device. The external display device may provide a better viewing experience than a display of the portable computing device. The media content or a command to access the media content is not sent from the portable computing device to a media device coupled to the external display device. Instead, the media player receives at least one command from an application server that enables the media player to access the media content and to send the media content to the external display device when a format of the media content is playable by the media player. When the format of the media content is not playable by the media player, the media player may receive transcoded media content that is playable by the media player from the application server. The transcoded media content is played and sent to the external display device.

Figure 6:
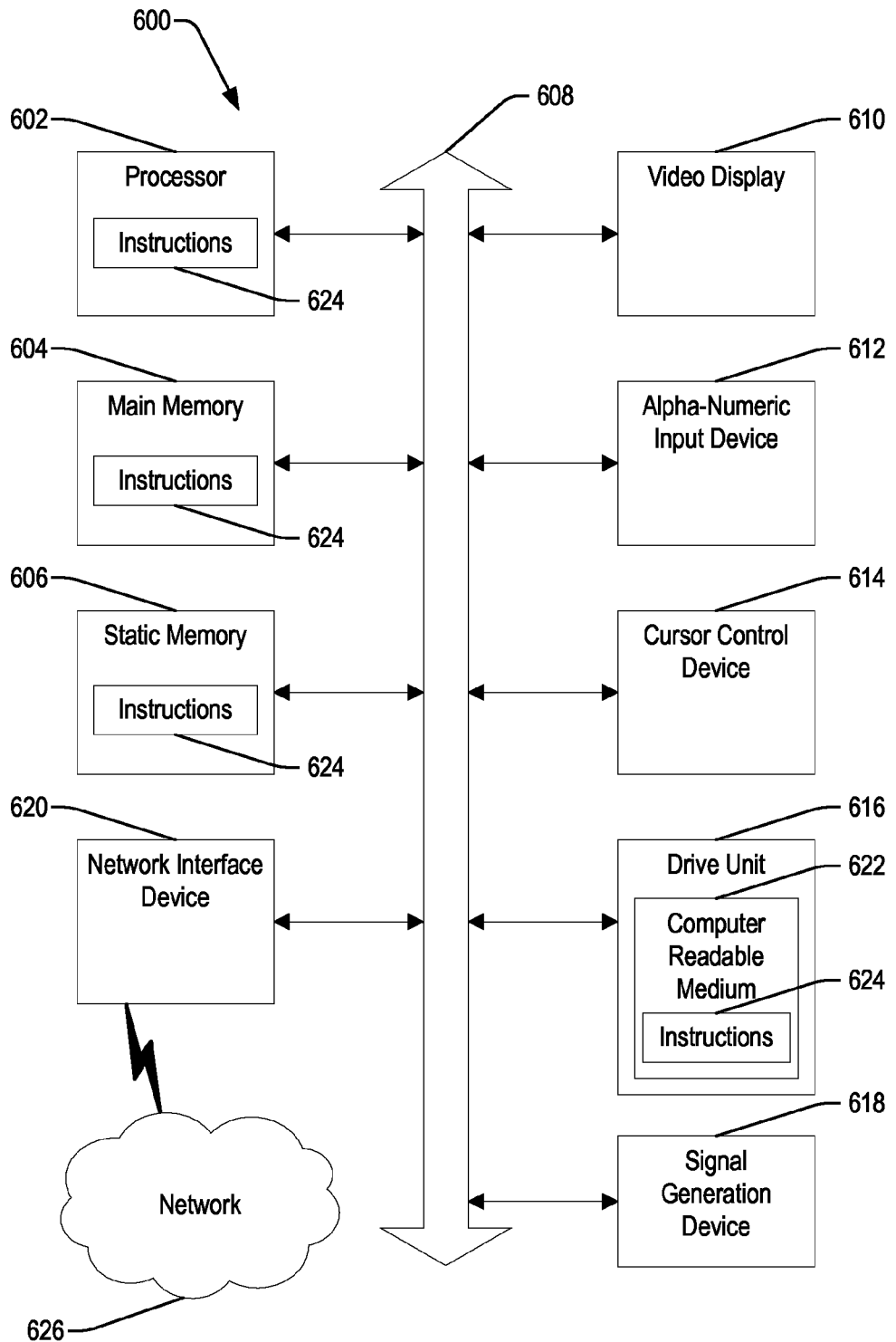
FIG. 6 is a block diagram of an illustrative embodiment of a general computer system.

Referring to FIG. 6, an illustrative embodiment of a general computer system is shown and is designated 600. The computer system 600 may include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the portable computing device 102, the display device 104, the application server 106, the media device 108, the content providers 112, the CPE 128, and the computer system 130 described with reference to FIG. 1.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a projection television system, a flat panel display, or a solid state display. Additionally, the computer system 600 may include an input device 612, such as a keyboard, and a cursor control device 614, such as a mouse. The computer system 600 may also include a disk drive unit 616, a signal generation device 618, such as a speaker or remote control, and a network interface device 620. Some computer systems 600 may not include an input device (e.g., a server may not include an input device).

In a particular embodiment, as depicted in FIG. 6, the disk drive unit 616 may include a computer-readable non-transitory storage medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium 622 that stores instructions 624 or receives, stores and executes instructions 624, so that a device connected to a network 626 may communicate voice, video or data over the network 626. Further, the instructions 624 may be transmitted or received over the network 626 via the network interface device 620.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing or encoding a set of instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method comprising:
identifying, at a portable computing device, media content that is accessible from a remote computing device via a network;
receiving user input associated with a particular media content item of the media content, the user input indicating selection of an option to send media to a second device, wherein the user input does not identify the second device;
generating a message in response to the user input, wherein the message includes information identifying the particular media content item;
sending the message from the portable computing device to an application server;
receiving, at the portable computing device from the application server, a query to specify a destination device for the particular media content from a listing of available destination devices when the application server identifies more than one available destination device; and
sending, from the portable computing device to the application server, a second message that causes the application server to send information to the destination device specified in the second message without routing the information to the destination device via the portable computing device, wherein the information causes the destination device to automatically play the particular media content item.

2. The method of claim 1, further comprising receiving a success message from the application server when the information is sent to the destination device.

3. The method of claim 1, further comprising receiving search criteria from a user of the portable computing device, wherein the portable computing device identifies the media content based on the search criteria.

4. The method of claim 3, further comprising sending a search query to a search engine.

5. The method of claim 4, wherein the search engine is a public search engine, a private search engine associated with a content provider associated with the destination device, a local service search engine associated with a particular device associated with the portable computing device, or a combination thereof.

6. The method of claim 1, wherein the media content is available from a content provider other than a service provider for the portable computing device.

7. The method of claim 1, wherein the media content includes media content stored at a media recorder associated with the destination device, media content that is available to the destination device based on a service tier associated with the destination device, media content scheduled for transmission by a content provider, or on-demand media content.

8. The method of claim 1, wherein the message includes information identifying a network address at the remote computing device, the network address corresponding to the particular media content item.

9. The method of claim 1, wherein the portable computing device includes a mobile communication device.

10. The method of claim 1, wherein the sending the message from the portable computing device to the application server comprises sending the message via a mobile communication network.

11. The method of claim 1, wherein the second device is identifiable by data stored at a database accessible to the application server, and wherein the application server queries the database to determine the listing of possible destination devices.

12. The method of claim 1, wherein the sending the message from the portable computing device to the application server comprises sending the message via a residential gateway, wherein the second device is identifiable by data stored at a database accessible to the application server, and wherein the application server queries the database to determine the listing of possible destination devices associated with the residential gateway.

13. The method of claim 12, further comprising receiving a success message from the application server when second information is sent from the application server to a particular device in response to the message, wherein the second information is sent to the particular device from the application server when the application server determines that the listing of possible destination devices includes only the particular device, and wherein the second information causes the particular device to automatically play the particular media content item.

14. A system comprising:
a processor of an application server; and
a memory accessible to the processor, the memory comprising instructions executable by the processor to perform operations comprising:
receiving a message from a portable computing device via a mobile communication network, wherein the message includes information identifying a network address of a particular media content item, and wherein the message fails to identify a destination device for the particular media content item;
determining a listing of devices associated with the portable computing device, wherein each device in the listing of devices is able to play media content;
identifying a particular device from the listing of devices to play the particular media content item;
determining whether the particular device is able to play the particular media content item based on a format of the particular content item; and
sending a command to the particular device via a wide area network different than the mobile communication network when the particular device is able to play the particular media content item based on the format, wherein the command causes the particular device to access the particular media content item at the network address and causes the particular device to play the particular media content item.

15. The system of claim 14, wherein the operations further include:
accessing the particular media content item at the network address when the particular device is not able to play the particular media content item based on the format;
transcoding the particular media content item into a transcoded particular media content item, wherein the transcoded particular media content item is in a format that the particular device is able to play; and
sending the transcoded particular media content item to the particular device.

16. The system of claim 14, wherein the particular device is a set top box device.

17. The system of claim 14, wherein the particular device is identified based on a user account associated with the portable computing device.

18. The system of claim 14, wherein the identifying the particular device comprises:
   sending the listing of devices to the portable computing device when the listing of devices includes more than a single device; and
   receiving a selection of the particular device from the portable computing device in response to sending the listing of devices.

19. A computer-readable storage device comprising instructions, that when executed by a processor, cause the processor to perform operations comprising:
   receiving a message from a portable computing device via a residential gateway, wherein the message includes information identifying a network address of a particular media content item, and wherein the message fails to identify a destination device for the particular media content item;
   determining a listing of devices associated with the residential gateway, wherein each device in the listing of devices is able to play media content;
   identifying a particular device from the listing of devices to play the particular media content item;
   determining whether the particular device is able to play the particular media content item based on a format of the particular media content item; and
   sending a command to the particular device via the residential gateway when the particular device is able to play the particular media content item based on the format, wherein the command causes the particular device to access the particular media content item at the network address and automatically play the particular media content item.

20. The computer-readable storage device of claim 19, wherein the identifying the particular device from the listing of devices comprises:
   identifying the particular device as a device in the listing of devices when the listing of devices includes a single device;
   sending a query to the portable computing device to select the particular device from the listing of devices when the listing of devices includes more than one device; and
   receiving an indicator of the particular device from the portable computing device in response to the query.

* * * * *